United States Patent
Lee et al.

(10) Patent No.: US 9,268,525 B2
(45) Date of Patent: Feb. 23, 2016

(54) BIT STREAM PROCESSING DEVICE FOR PIPE-LINED DECODING AND MULTIMEDIA DEVICE INCLUDING THE SAME

(71) Applicant: Samsung Electronics Co., Ltd., Suwon-Si, Gyeonggi-Do (KR)

(72) Inventors: Kyung-Koo Lee, Hwaseong-si (KR); Jin-Hong Oh, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 14/016,414

(22) Filed: Sep. 3, 2013

(65) Prior Publication Data

US 2014/0068118 A1    Mar. 6, 2014

(30) Foreign Application Priority Data

Sep. 6, 2012    (KR) .................. 10-2012-0098806

(51) Int. Cl.
*G06F 3/00*      (2006.01)
*G06F 5/06*      (2006.01)
(Continued)

(52) U.S. Cl.
CPC ............ *G06F 5/065* (2013.01); *G06F 9/461* (2013.01); *H04N 19/129* (2014.11); *H04N 19/172* (2014.11); *H04N 19/174* (2014.11); *H04N 19/423* (2014.11); *H04N 19/436* (2014.11); *H04N 19/44* (2014.11)

(58) Field of Classification Search
CPC ....... G06F 5/065; G06F 9/401; H04N 19/129; H04N 19/423; H04N 19/172; H04N 19/174; H04N 19/44; H04N 19/436
See application file for complete search history.

(56) References Cited

U.S. PATENT DOCUMENTS 5,453,789 A *   9/1995   Machida et al. ............ 348/400.1
6,070,201 A *   5/2000   Tanaka et al. .................. 710/52
(Continued)

FOREIGN PATENT DOCUMENTS

JP     07-221797 A    8/1995
JP     2000-324490 A    11/2000
(Continued)

OTHER PUBLICATIONS

Puri A. et al.: "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849. XP004607150, ISSN: 0923-5965.*

(Continued)

*Primary Examiner* — Henry Tsai
*Assistant Examiner* — Jing-Yih Shyu
(74) *Attorney, Agent, or Firm* — Harness, Dickey & Pierce, P.L.C.

(57) ABSTRACT

A bit stream processing device may include a virtual division memory, a stream shift buffer, a decoder circuit, and a controller. The virtual division memory may be divided into a plurality of group memory regions configured to store a plurality of stream groups in the respective group memory regions and to output a memory bit stream. The stream groups may be included in an input bit stream. The stream shift buffer is configured to receive and store the memory bit stream and output a buffer bit stream. The decoder circuit is configured to perform a decoding operation on the buffer bit stream from the stream shift buffer. The controller is configured to control operations of the virtual division memory, the stream shift buffer, and the decoder circuit.

13 Claims, 13 Drawing Sheets

(51) Int. Cl.
*H04N 19/174* (2014.01)
*H04N 19/129* (2014.01)
*H04N 19/44* (2014.01)
*H04N 19/172* (2014.01)
*H04N 19/436* (2014.01)
*H04N 19/423* (2014.01)
*G06F 9/46* (2006.01)

(56) References Cited

U.S. PATENT DOCUMENTS

| | | | |
|---|---|---|---|
| 6,349,115 | B1 | 2/2002 | Tahara et al. |
| 6,438,168 | B2 * | 8/2002 | Arye ........................ 375/240.03 |
| 6,940,909 | B2 * | 9/2005 | Linzer ...................... 375/240.25 |
| 7,346,112 | B2 | 3/2008 | Okawahara et al. |
| 7,813,617 | B2 | 10/2010 | Okuyama |
| 7,916,146 | B1 * | 3/2011 | Keller et al. .................. 345/506 |
| 8,428,125 | B2 * | 4/2013 | Oguz ....................... 375/240.08 |
| 2002/0031126 | A1 * | 3/2002 | Crichton et al. .............. 370/394 |
| 2012/0185620 | A1 * | 7/2012 | Cheng et al. .................... 710/52 |
| 2013/0121410 | A1 * | 5/2013 | Chang et al. ............. 375/240.12 |

FOREIGN PATENT DOCUMENTS

| | | |
|---|---|---|
| JP | 2002-197053 A | 7/2002 |
| JP | 2004-343553 A | 12/2004 |
| JP | 2006-286136 A | 10/2006 |
| JP | 2009-177833 A | 8/2009 |
| KR | 1999-0077518 A | 10/1999 |

OTHER PUBLICATIONS

Bjontegaard G. et al.: "Overview of the H.2641 AVC video coding standard" IEEE Transactions on Circuits and Systems for Video Technology, IEEE Service Center, Piscataway, NJ, US, vol. 13, No. 7, Jul. 1, 2003, pp. 560-576, XP011099249, ISSN: 1051-8215.*

Chong-Wah Ngo et al.: "Video Partitioning by Temporal Slice Coherency" IEEE Transactions on Circuits and Systems for Video Technology, IEEE Service Center, Piscataway, NJ, US, vol. 11, No. 8, Aug. 1, 2001, XPOII014230, ISSN: 1051-8215.*

* cited by examiner

FIG. 3
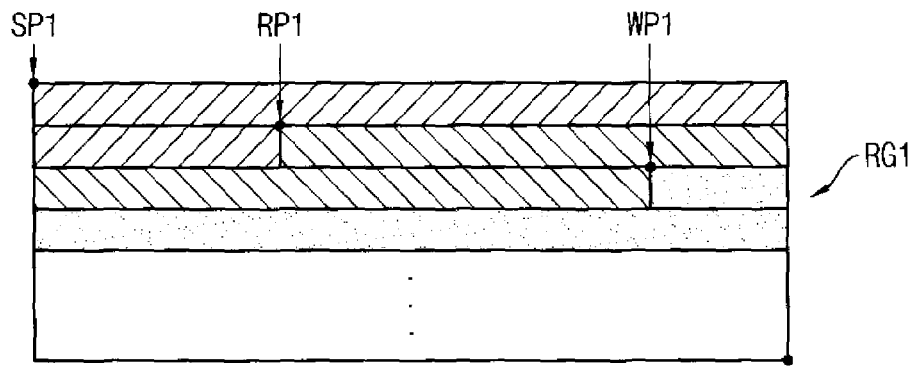
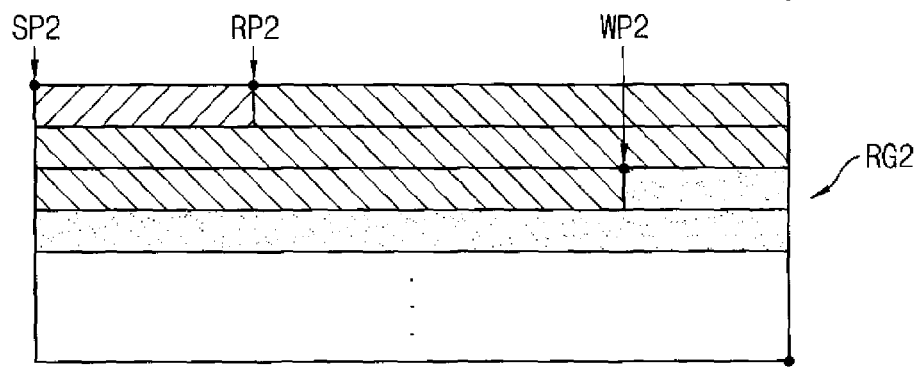
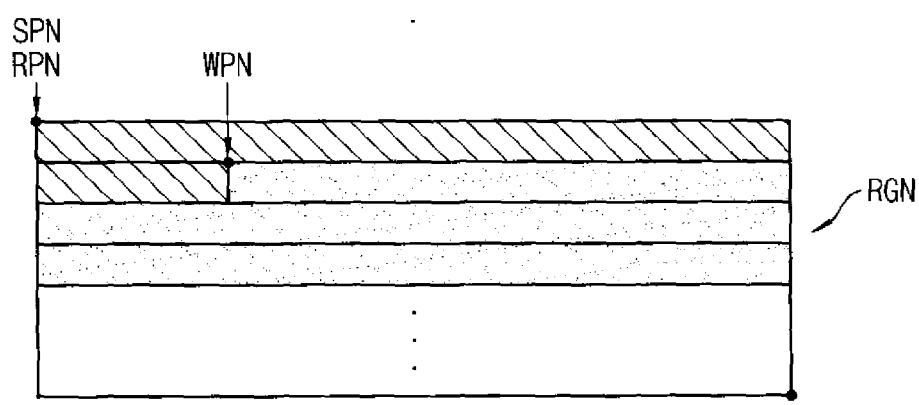

SLC11:
| SLICE HEADER | 0 | 1 | ... | 20 | 21 | 30 | 31 |
| ... | 36 | 37 | 46 | 47 | ... | 52 | 53 | 62 | 63 | ... | 86 |

SLC12:
| SLICE HEADER | 87 | 88 | ... | 96 | 97 | 104 | 105 |
| ... | 112 | 113 | 120 | 121 | ... | 128 | 129 | 136 | 137 |

SLC13:
| SLICE HEADER | 138 | 139 | ... | 144 | 145 | 152 | 153 |
| 154 | 155 | ... | 190 | 191 |

FIG. 7B

SLC21:
| SLICE HEADER | 22 | 23 | 24 | 25 | 26 | 27 | 28 |
| 29 | 38 | 39 | 40 | 41 | 42 | 43 | 44 | 45 | 54 | 55 | 56 |
| 57 | 58 | 59 | 60 | 61 |

FIG. 7C

SLC31:
| SLICE HEADER | 98 | 99 | 100 | 101 | 102 | 103 | 114 |
| 115 | 116 | 117 | 118 | 119 | 130 | 131 |

SLC32:
| SLICE HEADER | 132 | 133 | 134 | 135 | 146 | 147 | 148 |
| 149 | 150 | 151 |

BIT STREAM PROCESSING DEVICE FOR PIPE-LINED DECODING AND MULTIMEDIA DEVICE INCLUDING THE SAME

CROSS-REFERENCE TO RELATED APPLICATION

This U.S. Non-provisional application claims priority under 35 USC §119 to Korean Patent Application No. 10-2012-0098806, filed on Sep. 6, 2012, in the Korean Intellectual Property Office (KIPO), the contents of which are herein incorporated by reference in their entirety.

BACKGROUND

1. Field

Example embodiments relate generally to data processing, and more particularly to a bit stream processing device for pipe-lined decoding that rearranges an input bit stream, and a multimedia device including the hit stream processing device.

2. Discussion of Related Art

Mobile devices, such as smart phones, are being developed to have a function as a mobile multimedia device in addition to an original function as a mobile communication device. To support the function as the multimedia device under limitations of narrow frequency bandwidth and insufficient storage capacity, data compressing techniques are applied to the mobile devices.

Processing large amounts of multimedia data requires large capacity memory storage devices and large data bandwidth. For example, 24-bit true-color image of 640*480 resolution corresponds to 640*480*24 data bits per frame. In the case of 30 frames per second, a bandwidth of about 221 Megabits per second is required and a memory space of about 1200 Gigabits is required for storing a movie having a 90-minute running time. Thus, the compression coding scheme is often used for multimedia data which includes video data and audio data.

In encoding and transferring the video data, flexible macroblock ordering (FMO), by which macroblocks in a frame are rearranged and transferred in a flexible order, may be adopted to enhance compression rate and image quality. In this case, decoding speed may be degraded if continuity of the decoded macroblocks is not secured.

SUMMARY

At least one example embodiment of the inventive concept provides a bit stream processing device capable of performing pipe-lined decoding.

At least one example embodiment of the inventive concepts provides a multimedia device including the bit stream processing device capable of performing pipe-lined decoding.

According to an example embodiment of the inventive concepts, a bit stream processing device may include a virtual division memory, a stream shift buffer, a decoder circuit, and a controller. The virtual division memory may be divided into a plurality of group memory regions configured to store a plurality of stream groups in the respective group memory regions and to output a memory bit stream. The stream groups may be included in an input bit stream. The stream shift buffer configured to receive and store the memory bit stream and output a buffer bit stream. The decoder circuit configured to perform a decoding operation on the buffer bit stream from the stream shift buffer. The controller configured to control operations of the virtual division memory, the stream shift buffer, and the decoder circuit.

In one example embodiment, the virtual division memory is configured to perform a write operation based on a write control signal to store the received stream group in the corresponding group memory region, and to perform a read operation based on a read control signal to output the memory bit stream from the group memory region corresponding to the stream group that is currently decoded by the decoder circuit. The write control signal and the read control signal may be provided by the controller. A plurality of write pointers may correspond to the group memory regions, and the controller is configured to generate the write control signal based on the write pointer corresponding to the group memory region in which the received stream group is stored. The controller may, whenever the write operation is performed, update the write pointer corresponding to the group memory region in which the received stream group is stored.

In one example embodiment, each one of a plurality of read pointers may correspond to each one of the group memory regions, and the controller is configured to generate the read control signal based on the read pointer corresponding to the group memory region from which the memory bit stream is output. The controller may, whenever the read operation is performed, update the read pointer corresponding to the group memory region from which the memory bit stream is output.

In one example embodiment, the stream shift buffer is configured to provide a buffer pointer indicating a position of valid data among buffered data in the stream shift buffer. The buffer pointer may be decreased as a bit number of the memory bit stream received from the virtual division memory and increased as a bit number of the buffer bit stream output to the decoder circuit.

In one example embodiment, the controller is configured to control a timing of generating the read control signal based on the buffer pointer.

In one example embodiment, the controller is configured to divide the virtual division memory into the group memory regions based on region start pointers.

In one example embodiment, the controller is configured to determine the region start pointers based on a number of the stream groups.

In one example embodiment, when a stream group that is currently being decoded by the decoder circuit is changed from one stream group to another stream group, the controller is configured to store a current state of the stream shift buffer as backup information of the one stream group. The controller configured to restore a state of the stream shift buffer to a previous state corresponding to the other stream group based on the backup information of the other stream group that is previously stored in the controller.

In one example embodiment, the backup information may include buffered data in the stream shift buffer and a buffer pointer may indicate a position of valid data among the buffered data in the stream shift buffer.

In one example embodiment, the stream groups may be slice groups according to H.264/MPEG-4 standard, each slice group may include at least one slice and each slice includes at least one macroblock, and the slice groups may be transferred according to a flexible macroblock ordering (FMO) scheme.

In one example embodiment, the controller is configured to control operations of the virtual division memory and the stream shift buffer such that the decoder circuit decodes, in raster-scan order, a plurality of macroblocks included in the slice groups corresponding to one frame.

In one example embodiment, when a slice group currently being decoded by the decoder circuit is changed from one slice group to another slice group, the controller is configured to store a current state of the stream shift buffer as backup information of the one slice group. The controller configured to restore a state of the stream shift buffer to a previous state corresponding to the other slice group based on the backup information of the other slice group that is previously stored in the controller.

In one example embodiment, the controller is configured to form a slice group map based on a sequence parameter set and a picture parameter set included in the input bit stream. Whenever data bits of each macroblock are provided to the decoder circuit, the controller is configured to determine, based on the slice group map, whether the slice group currently being decoded by the decoder circuit has changed.

According to an example embodiment of the inventive concepts, a multimedia device may include a reception interface, a virtual division memory, a stream shift buffer, a decoder circuit, a controller, and a display unit. The reception interface is configured to receive an input bit stream including a plurality of stream groups. The virtual division memory may be divided into a plurality of group memory regions to store the stream groups in their respective group memory regions, and the virtual division memory is configured to output a memory bit stream. The stream shift buffer is configured to receive and store the memory bit stream and to output a buffer bit stream. The decoder circuit is configured to perform a decoding operation on the buffer bit stream from the stream shift buffer and to output display data. The controller is configured to control operations of the virtual division memory, the stream shift buffer, and the decoder circuit. The display unit is configured to display images based on the display data.

In one example embodiment, the stream groups may be slice groups according to H.264/MPEG-4 standard, each slice group may include at least one slice and each slice may include at least one macroblock. The slice groups may be transferred according to flexible macroblock ordering (FMO) scheme. The controller may control operations of the virtual division memory and the stream shift buffer such that the decoder circuit decodes, in raster-scan order, a plurality of macroblocks included in the slice groups corresponding to one frame.

In one example embodiment, the controller is configured to provide a write control signal to the virtual division memory and the virtual division memory configured to perform a write operation to store the plurality of stream groups in their corresponding group memory regions based on the write control signal.

In one example embodiment, the controller configured to provide a read control signal to the virtual division memory and the virtual division memory configured to perform a read operation to output a memory bit stream of a currently decoded stream group from the group memory regions based on the read control signal.

In one example embodiment, when a currently decoded stream group is changed from one stream group to another stream group, the controller configured to (i) store a current state of the stream shift buffer as backup information and (ii) restore a state of the stream shift buffer to a previous state. The previous state may correspond to the other stream group based on a backup information of the other stream group.

According to an example embodiment, a multimedia device includes a decoder configured to perform a pipe-lined decoding operation on a received bit stream using a virtual division memory and a stream shift buffer. The received bit stream includes slice groups that include macroblocks, and the decoder is configured to use the macroblocks in at least one of the slice groups of the received bit stream to restore lost macroblocks of another one of the slice groups.

BRIEF DESCRIPTION OF THE DRAWINGS

Example embodiments of the inventive concept will be more clearly understood from the following detailed description taken in conjunction with the accompanying drawings.

FIG. 3 is a diagram for describing an operation of the virtual division memory of FIG. 2.

FIG. 6 is a diagram illustrating an example disposition of macroblocks included in the slice groups of FIG. 5.

FIGS. 7A, 7B and 7C are diagrams illustrating example slices included in the respective slice groups of FIG. 6.

DETAILED DESCRIPTION

Figure 1:
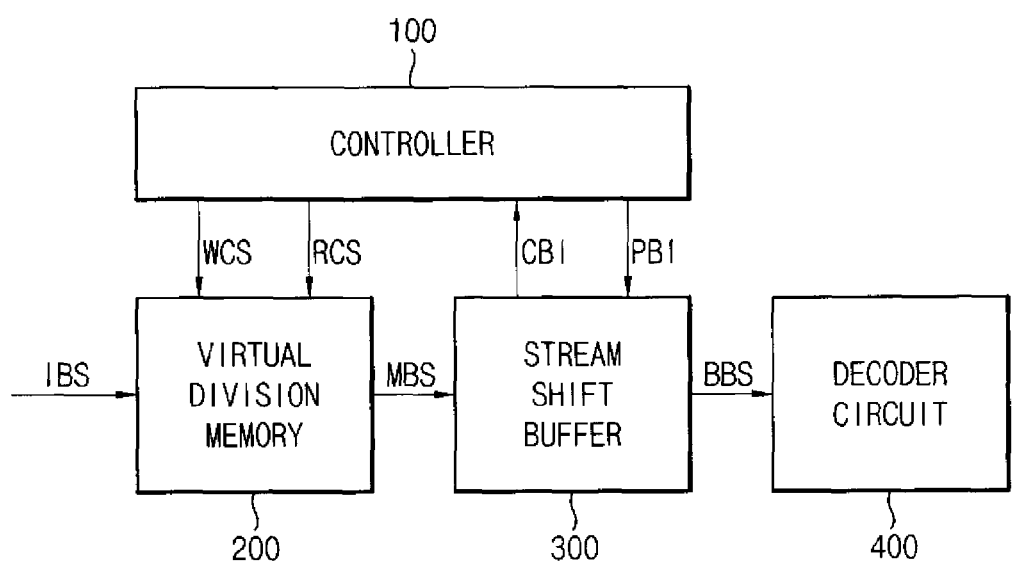
FIG. 1 is a block diagram illustrating a bit stream processing device, according to example embodiments of the inventive concepts.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a bit stream processing device, according to example embodiments of the inventive concepts.

Referring to FIG. 1, a bit stream processing device 10 includes a controller 100, a virtual division memory 200, a stream shift buffer 300 and a decoder circuit 400.

The virtual division memory 200 configured to receive an input bit stream IBS and output a memory bit stream MBS. As will be described with reference to FIGS. 2 and 3, the virtual division memory 200 may be divided into a plurality of group memory regions RG1 through RGN to store a plurality of stream groups SG1 through SGN in the respective group memory regions RG1 through RGN, where the stream groups SG1 through SGN are included in the input bit stream IBS.

The stream shift buffer 300 configured to receive and store the memory bit stream MBS provided from the virtual division memory 200 and output a buffer bit stream BBS. The decoder circuit 400 configured to perform a decoding operation on the buffer bit stream BBS from the stream shift buffer 300. The controller 100 configured to control operations of the virtual division memory 200, the stream shift buffer 300 and the decoder circuit 400.

The virtual division memory 200 may include a memory region that may be one physical device and the one physical memory region may be divided logically and/or virtually into the plurality of group memory regions RG1 through RGN using region start pointers SP1 through SPN as illustrated in FIG. 3. The virtual division memory 200 may include various memory device types. For example, the virtual division memory 200 may include a volatile memory, such as a dynamic random access memory (DRAM), a static random access memory (SRAM), and/or other like volatile memory devices, in addition to (or alternatively) including non-volatile memory such as a resistive random access memory (RRAM), a phase-change random access memory (PRAM), a magnetic random access memory (MRAM), and/or other like non-volatile memory devices.

The virtual division memory 200 is configured to perform a write operation based on a write control signal WCS, which is provided from the controller 100, to store the received stream group SGi (i=1, 2, . . . , or N) in the corresponding group memory region RGi. In addition, the virtual division memory 200 is configured to perform a read operation based on a read control signal RCS, which is provided from the controller 100, to output the memory bit stream MBS from the group memory region RGk (k=1, 2, . . . , or N) corresponding to the stream group SGk that is currently decoded by the decoder circuit 400.

Accordingly, the bit stream processing device 10 according to example embodiments is configured to perform the write operation or the read operation independently with respect to each stream group by partitioning the one physical memory. The bit stream processing device 10 is configured to rearrange the order of the stream groups included in the input bit stream IBS and provide the memory bit stream MBS for the efficient pipe-lined decoding. For example, where the input bit stream IBS is transferred according to a flexible macroblock ordering (FMO) scheme, the bit stream processing device 10 is configured to perform the pipe-lined decoding in raster-scan order and thus decoding speed may be enhanced.

As described with reference to FIGS. 9 and 10, when a stream group that is currently being decoded by the decoder circuit 400 is changed from a first stream group RGi to a second stream group RGk, the controller 100 is configured to store a current state of the stream shift buffer 300 as backup information CBI of the first stream group RGi and then restore a state of the stream shift buffer 300 to a previous state that corresponds to the a second stream group RGk. Restoring the state of the stream shift buffer 300 may be based on the backup information PBI of the second stream group RGk that was previously stored in the controller 200. Accordingly, the pipe-lined decoding performed by the bit stream processing device 10 may be supported by the stream shift operation without degrading a decoding speed.

Figure 2:
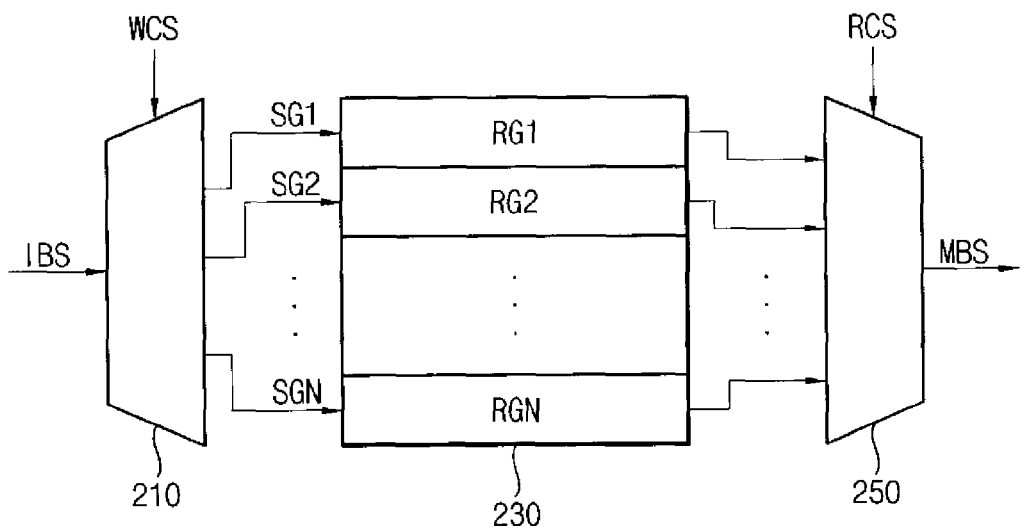
FIG. 2 is a block diagram illustrating an example of a virtual division memory included in the bit stream processing device of FIG. 1.

FIG. 2 is a block diagram illustrating an example of a virtual division memory included in the bit stream processing device of FIG. 1. FIG. 3 is a diagram that describes an operation of the virtual division memory of FIG. 2.

Referring to FIG. 2, the virtual division memory 200 may include a write control unit 210, a memory region 230 and a read control unit 250.

The write control unit 210 is configured to store the received stream group SGi in the corresponding group memory region RGi based on the write control signal WCS from the controller 100. The read control unit 250 is configured to output the memory bit stream MBS from the group memory region RGk corresponding to the stream group SGk that is currently decoded by the decoder circuit 400, based on the read control signal RCS from the controller 100.

Referring to FIGS. 2 and 3, the memory region 230 in the virtual division memory 200 may be divided into the plurality of group memory regions RG1 through RGN. As illustrated in FIG. 3, the controller 100 may logically divide the memory region 230 into the group memory regions RG1 through RGN based on the region start pointers SP1 through SPN. The region start pointers SP1 through SPN may be stored in the controller 100 and the controller may refer to the region start pointers SP1 through SPN to generate the write control signal WCS and the read control signal RCS. The region start pointers SP1 through SPN may be provided from the controller 100 to the write control unit 210 and the read control unit 250. The controller 100 is configured to determine the region start pointers SP1 through SPN based on the number of the stream groups SG1 through SGN. For example, where the input bit stream IBS includes two stream groups SP1 and SP2, the memory region 230 may be divided into a first group memory region RG1 and a second group memory region RG2. In such instances, the region start pointer SP1 of the first group memory region RG1 may be a start address of the memory region 230 and the region start pointer SP2 of the second group memory region RG2 may be an intermediate address of the memory region 230 that partitions or otherwise separates the first and second group memory regions RG1 and RG2. The number of the group memory regions may be changed in various ways depending on the stream groups, and the sizes of the group memory regions may be different from each other.

FIG. 3 shows a first region MSP1 representing a memory space in which already-read data are stored, a second region MSP2 representing a memory space in which valid data to be read later are stored, and a third region MSP3 representing an empty memory space. In other words, a write operation and a read operation are already performed with respect to the first region MSP1, a write operation is performed but a read operation is not performed with respect to the second region MSP2, and a write operation is not performed with respect to the third region MSP3.

Accordingly, the memory spaces MSP1, MSP2 and MSP3 of the respective memory regions RG1 through RGN may be discerned using a plurality of write pointers WP1 through WPN and a plurality of read pointers RP1 through RPN. The above-mentioned write and read operations may be performed based on the write pointers WP1 through WPN and the read pointers RP1 through RPN.

Among the write pointers WP1 through WPN, corresponding to the group memory regions RG1 through RGN, respectively, the controller 100 is configured to generate the write control signal WCS based on the write pointer WPi corresponding to the group memory region RGi in which the received stream group SGi is stored. Whenever the write operation is performed, the controller 100 may update the write pointer WPi corresponding to the group memory region RGi in which the received stream group SGi is stored. In this way, the controller 100 is configured to control the virtual division memory 200 to store the received data bits of the stream group SGi sequentially in the corresponding group memory region RGi.

Among the read pointers RP1 through RPN corresponding to the group memory regions RG1 through RGN, respectively, the controller 100 may generate the read control signal RCS based on the read pointer RPk corresponding to the group memory region RGk from which the memory bit stream MBS is output. Whenever the read operation is performed, the controller 100 may update the read pointer RPk corresponding to the group memory region RGk from which the memory bit stream MBS is output. In this way, the controller 100 is configured to control the virtual division memory 200 to read out the data bits of the memory bit stream MBS from the corresponding group memory region RGk.

Accordingly, a memory region may be divided logically using the region start pointers and the wire and read operations may be performed with respect to the respective stream groups using the write and read pointers, thereby supporting the pipe-lined decoding even when memory resources are limited.

Figure 4:
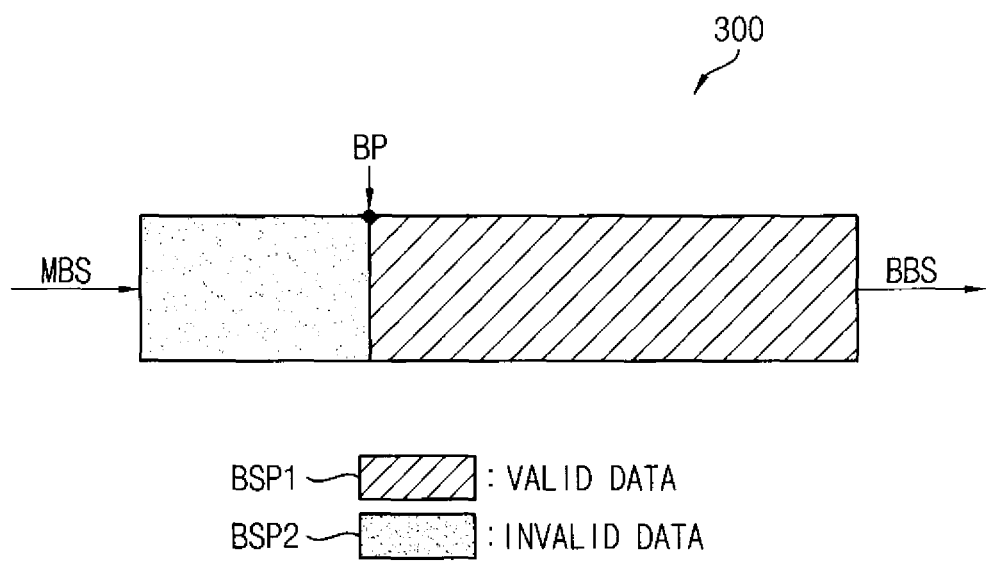
FIG. 4 is a diagram illustrating an operation of a stream shift buffer included in the bit stream processing device of FIG. 1.

FIG. 4 is a diagram for describing an operation of a stream shift buffer included in the bit stream processing device of FIG. 1.

Referring to FIG. 4, the stream shift buffer 300 is configured to provide a buffer pointer BP indicating a position of valid data among buffered data in the stream shift buffer 300. The stream shift buffer 300 receives and stores the memory bit stream MBS from the virtual division memory 200 and outputs the buffer bit stream BBS to the decoder circuit 400. In FIG. 4, a hatched first region BSP1 represents a buffer space in which the valid data are stored and a dotted second region BSP2 represents a buffer space in which the invalid data are stored. In other words, the first region BSP1 is configured to store the valid data that are to be provided to the decoder circuit 400 and the second region is configured to store the invalid data that were already provided to the decoder circuit 400. In such embodiments, buffer spaces BSP1 and BSP2 may be discerned using the buffer pointer BP.

A bit number of the buffer pointer BP may be decreased by an amount that is the same or similar as a bit number of the memory bit stream MBS that is received from the virtual division memory 200. The bit number of the buffer pointer BP may be increased by an amount that is the same or similar as a bit number of the buffer bit stream BBS that is output to the decoder circuit 400.

The controller 100 is configured to control a timing of generating the read control signal RCS based on the buffer pointer BP. For example, where the stream shift buffer 300 includes the entire buffer space of 64 bits, the controller 100 may activate the read control signal RCS when the buffer pointer BP indicates 32-bit point which is the center of the entire buffer space. In such a case, whenever half of the entire buffer space corresponds to the invalid buffer space, the memory bit stream MBS is output from the virtual division memory 200 and the stream shift buffer 300 may fill the second region BSP2 of the invalid data with the provided 32-bit valid data. Whenever the stream shift buffer 300 is filled with the valid data, the buffer pointer BP may be reset to indicate the start point of the entire buffer space.

According to an example embodiment, the above-mentioned stream groups SG1 through SGN may be slice groups according to the Advanced Video Coding (H.264/MPEG-4) standard, such that each slice group includes at least one slice and each slice includes at least one macroblock.

H.264/MPEG-4 is a standard for compressing video data, which is specified jointly by the International Telecommunications Union Telecommunication (ITU-T) and international Organization for Standardization (ISO). The H.264/MPEG-4 standard allows for flexibility for supporting various network environments and compression efficiency compared with the previous MPEC standard. H.264/MPEG-4 includes advanced motion estimation and compensation, block conversion for small block sizes without mismatch, in-loop deblock filtering for removing noises between the blocks, and improved entropy coding.

On the other hand, the H.264/MPEG-4 standard, in order to provide efficient error concealment, provides flexible macroblock ordering (FMO). A feature of H.264/MPEG-4 is that a frame image may be divided into slice groups. Each slice group may be divided into one or more slices. A slice may be defined as a distinct region of a frame that is encoded separately from other region in the same frame. Additionally, a slice may be defined as a continuous sequence of macroblocks included in the same distinct region of a frame.

For example, according to the FMO scheme, macroblocks of 16×6 pixels in a frame may be rearranged in an arbitrary order except a raster-scan order. In such cases, the frame is divided into one or more slice groups, each slice group is divided into one or more slices and each slice includes one or more macroblocks. Accordingly, the slice group, the slice, and the macroblock form a hierarchical structure. The slices may be transferred independently according to the FMO scheme, and thus efficient error concealment may be achieved, such that if a slice is lost during transfer, the lost slice may be recovered using the macroblocks of the slices adjacent to the lost slice.

According to the H.264/MPEG-4 standard, the process for decoding one frame of a compressed bit stream is as follows. Firstly a slice group map is formed by the decoder, and the macroblocks in the respective slice are sequentially decoded in the raster-scan order. When all of the slices are decoded, decoding of the frame is completed. Even though the conventional H.264/MPEG-4 compressed bit stream is transferred slice by slice independently, and the macroblocks in each slice are decoded in the raster-scan order, discontinuous decoding may occur between the macroblocks from the view point of the entire frame. That is, in the entire frame, some macroblocks may not be decoded in raster-scan order.

When the bit stream is encoded and transferred according to the FMO scheme, the shape and order of the slices may be arbitrary. In this case, the macroblocks may be stored in a discontinuous order and the discontinuously-stored macroblocks may be decoded discontinuously. Such discontinuous decoding may increase access rate to the memory, and thus, the decoding speed may be degraded or otherwise reduced.

According to example embodiments, even when the stream groups SG1 through SGN are the slice groups that are transferred in the FMO scheme, the bit stream processing device 10 stores the slice groups in the respective group memory regions RG1 through RGN that are logically divided, in order to perform the pipe-lined decoding in the raster-scan order. The bit stream processing device 10 may maintain the pipe-line structure comprised of the virtual division memory 200, the stream shift buffer 300 and the decoder circuit 400 with respect to the FMO bit stream and thus the decoding speed may be increased.

Hereinafter, the configuration and the operation of the bit stream processing device 10 are described in detail with respect to the case that the input bit stream IBS is encoded and transferred according to the FMO scheme of the H.264/MPEG-4 standard.

Figure 5:
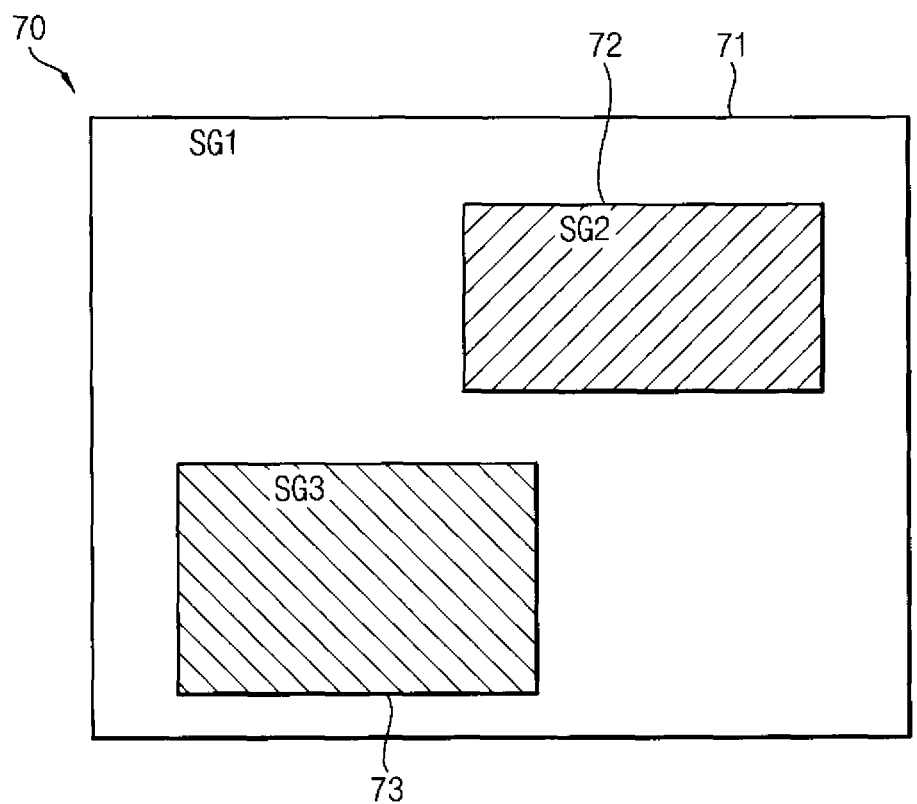
FIG. 5 is a diagram illustrating an example frame that is divided by three slice groups, according to an example embodiment.
Figure 6:
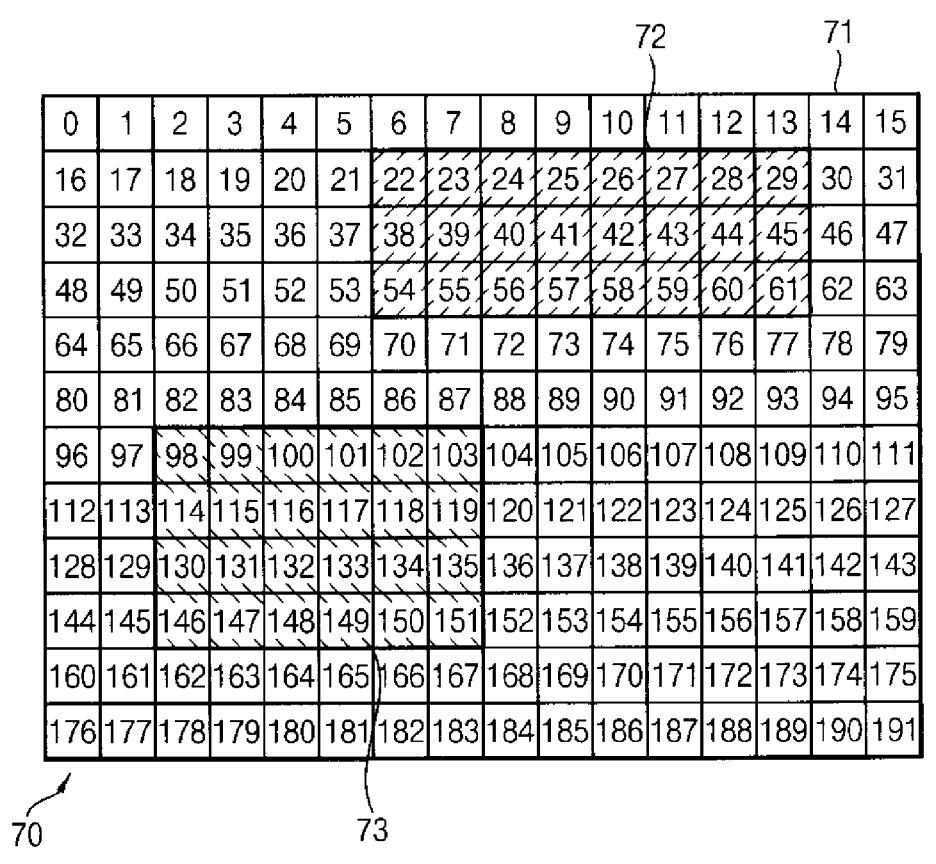

FIG. 5 is a diagram illustrating an example frame that is divided by three slice groups, according to an example embodiment. FIG. 6 is a diagram illustrating an example disposition of macroblocks included in the slice groups of FIG. 5. And FIG. 7A-C are diagrams illustrating example slices included in the respective slice groups of FIG. 6.

FIG. 5 illustrates an example frame 70 that is divided by three slice groups, according to an example embodiment. Frame 70 includes a first slice group (SG1) 71, a second slice group (SG2) 72 and a third slice group (SG3) 73. The first slice group 71 may correspond to a portion of the frame 70 that includes the second and third slice groups 72 and 73. For example, the first slice group 71 may include image information representing a background, and the second and third slice groups 72 and 73 may include image information representing objects that are moving or changing in the background. When the movement of the background is less and the objects move or change rapidly with respect to the background, the sub-regions of the frame 70 may be divided into the slice groups 71, 72 and 73 as illustrated in FIG. 5 and the encoded data based on the slice groups 71, 72 and 73 may be transferred.

FIG. 6 illustrates an example arrangement of macroblocks in the frame 70, in which 192 macroblocks are arranged in a matrix form of 12 rows and 16 columns. For convenience of illustration only the index serial numbers of the macroblocks are represented in FIG. 6. Referring to FIG. 6, among the 192 macroblocks, the twenty four macroblocks of the indices 22~29, 38~45 and 54~61 are included in the second slice group 72, the twenty four macroblocks of the indices 98~103, 114~119, 130~135 and 146~151 are included in the third slice group 73, and the other 144 macroblocks are included in the first slice group 71.

As such, according to the H.264/MPEG-4 standard, one frame 70 may be divided into one or more slice groups 71, 72 and 73, and each slice group may include one or more slices. For example, as illustrated in FIGS. 7A, 7B and 7C, the first slice group 71 may include three slices SLC11, SLC12 and SLC13, the second slice group 72 may include one slice SLC21, and the third slice group 73 may include two slices SLC31 and SLC32.

Each slice may include a slice header that may lead the macroblocks. The slice header may include information associated with the macroblocks and the corresponding slice. As illustrated in FIGS. 7A, 7B and 7C, the macroblock indices may be discontinuous within the same slice. As described above, the slices including the discontinuous macroblocks may be stored in one or more group memory regions corresponding to the slice groups and may be output from the group memory regions in the raster-scan order.

Figure 8:
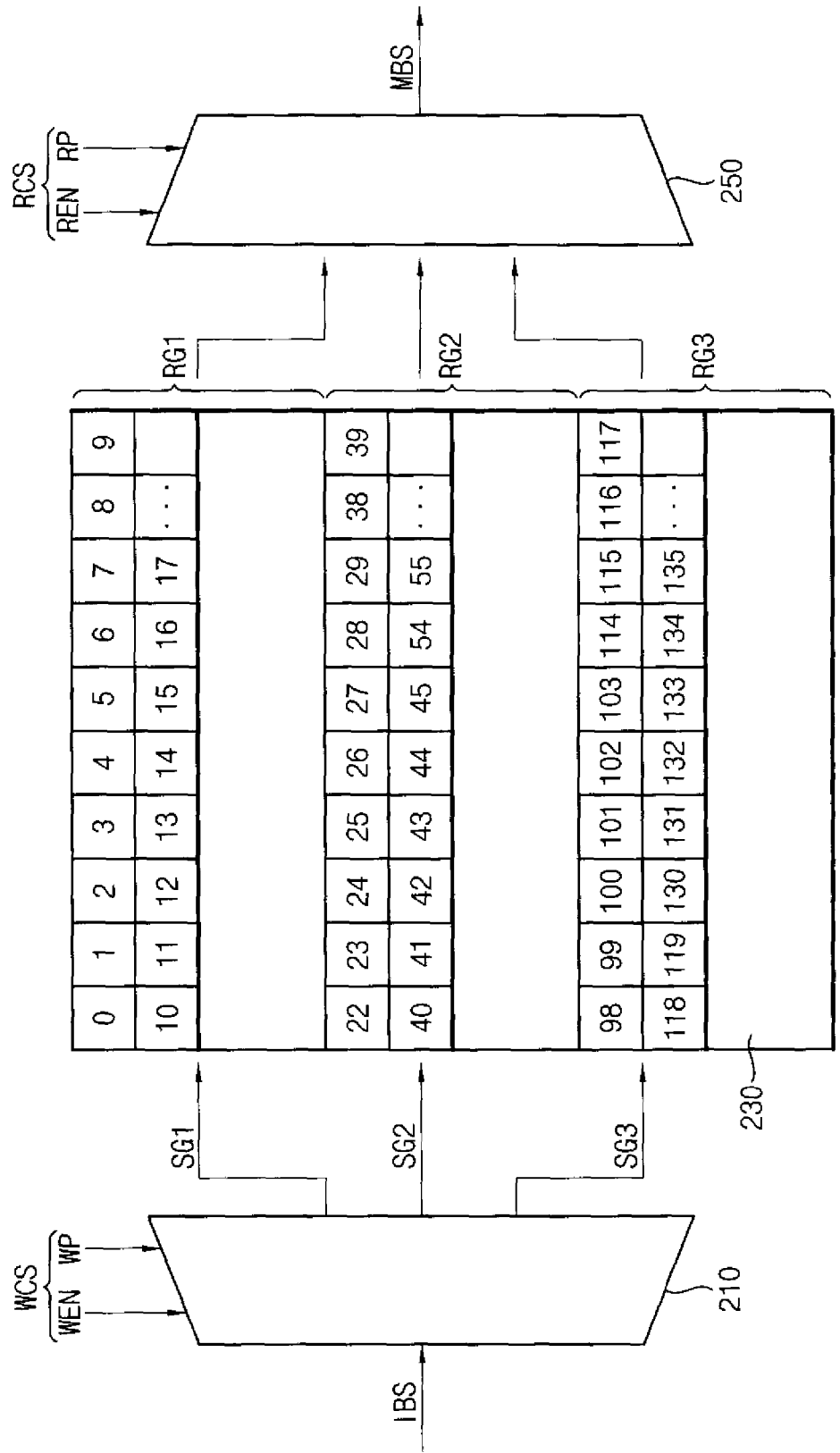
FIG. 8 is a diagram illustrating an operation of the virtual division memory with respect to the slice groups of FIG. 6.

FIG. 8 is a diagram illustrating an operation of the virtual division memory with respect to the slice groups of FIG. 6.

Referring to FIG. 8, the memory region 230 in the virtual division memory 200 may be divided into the three group memory regions RG1, RG2 and RG3 corresponding to the three slice groups SG1, SG2 and SG3, respectively. As described above, the controller 100 may determine the three region start pointers to divide the memory region 230 logically into the three group memory regions RG1, RG2 and RG3.

The write control unit 210 in the virtual division memory 200 may perform a write operation based on a write control signal WCS, which is provided from the controller 100, to store the received, stream groups, that is, the slice groups SGi (i=1, 2, 3) in the corresponding group memory region RGi. The write control signal WCS may include a write enable signal WEN indicating a timing of the write operation and a write pointer WP indicating a position in which the received data bits are to be stored.

As described with reference to FIG. 3, among the write pointers WP1, WP2 and WP3 corresponding to the group memory regions RG1, RG2 and RG3, respectively, the controller 100 is configured to generate the write control signal WCS based on the write pointer WPi corresponding to the group memory region RGi in which the received slice group SGi is stored. Whenever the write operation is performed, the controller 100 may update the write pointer WPi corresponding to the group memory region RGi in which the received slice group SGi is stored. Accordingly, the controller 100 may control the virtual division memory 200 to store the received data bits of the slice group SGi sequentially in the corresponding group memory region RGi.

For example, the controller 100 may parse the slice header from the currently received slice to determine to which slice group the currently received slice belongs, and then the controller 100 may select and provide the corresponding write pointer WP to the write control unit 210.

The read control unit 250 in the virtual division memory 200 may perform a read operation based on a read control signal RCS, which is provided from the controller 100, to output the memory bit stream MBS from the group memory region RGk (k=1, 2, 3) corresponding to the stream group SGk that is currently decoded by the decoder circuit 400. The read control signal RCS may include a read enable signal REN indicating a timing of the read operation and a read pointer RP indicating a position from which the data bits of the memory bit stream MBS are to be output.

As described with reference to FIG. 3, among the read pointers RP1, RP2 and RP3 corresponding to the group memory regions RG1, RG2 and RG3, respectively, the controller 100 may be configure to generate the read control signal RCS based on the read pointer RPk corresponding to the group memory region RGk from which the memory bit stream MBS is output. Whenever the read operation is performed, the controller 100 may update the read pointer RPk corresponding to the group memory region RGk from which the memory bit stream MBS is output. Accordingly, the controller 100 may control the virtual division memory 200 to read out the data bits of the memory bit stream MBS from the corresponding group memory region RGk.

For example, the controller 100 may form a slice group map as illustrated in FIG. 6 based on a sequence parameter set (SPS) and a picture parameter set (PPS), which are provided through the input bit stream IBS according to the H.264/MPEG-4 standard. Whenever the data bits for each macroblock are provided to the decoder circuit 400, the controller 100 is configured to determine, by referring to the slice group map, whether the slice group that is currently being decoded by the decoder circuit 400 is changed or not. As such, the controller 100 may determine from which group memory region the data bits of the memory bit stream MBS have to be output, and based on such a determination the controller 100 may select the corresponding read pointer to be provided to the read control unit 250 among the read pointers RP1, RP2 and RP3. In addition, as described with reference to FIG. 4, the controller 100 may determine a timing of generating the read control signal RCS based on the buffer pointer BP provided from the stream shift buffer 300.

Figure 9:
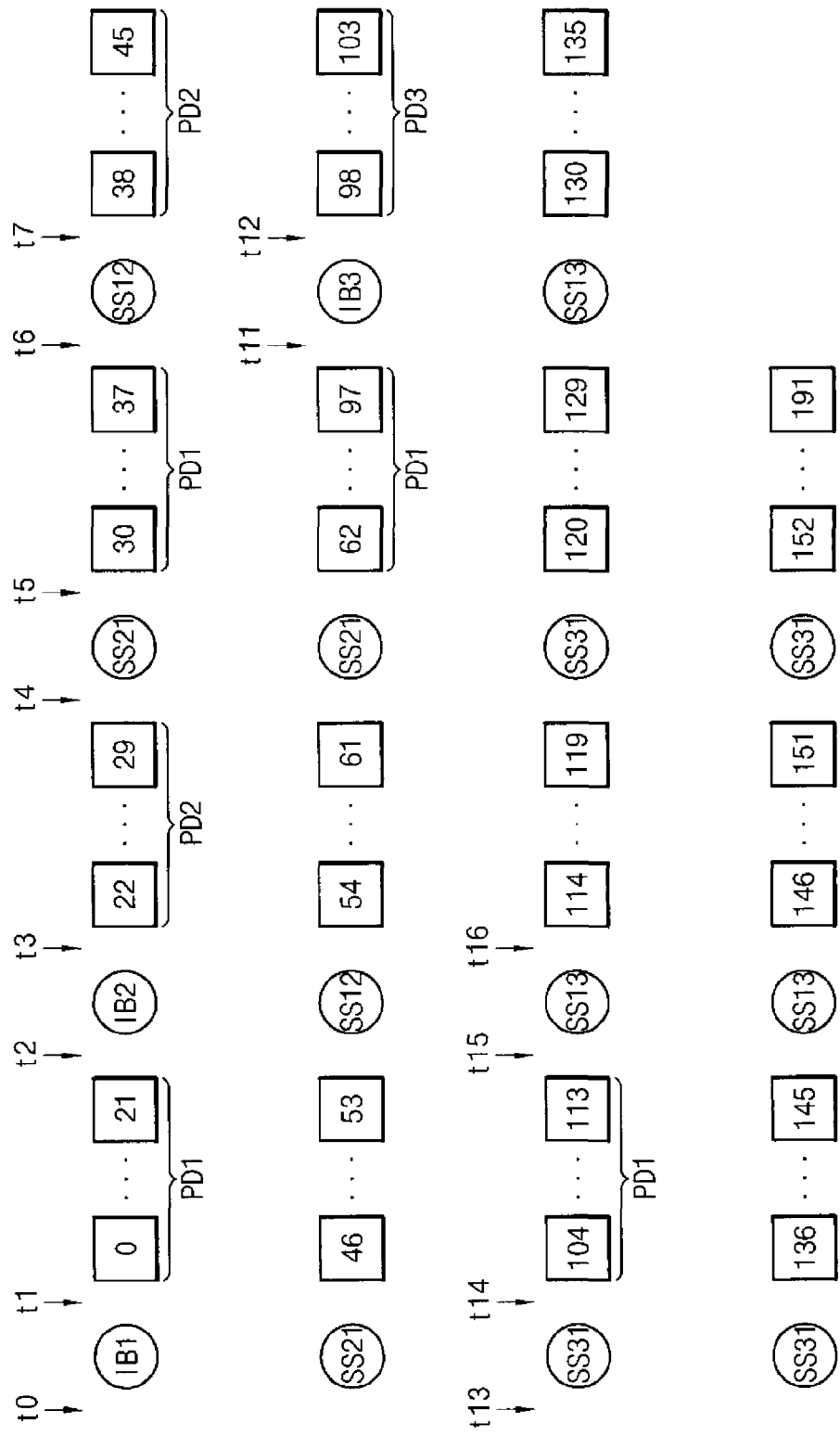
FIG. 9 is a diagram illustrating a pipe-lined decoding with respect to the slice groups of FIG. 6.
Figure 10:
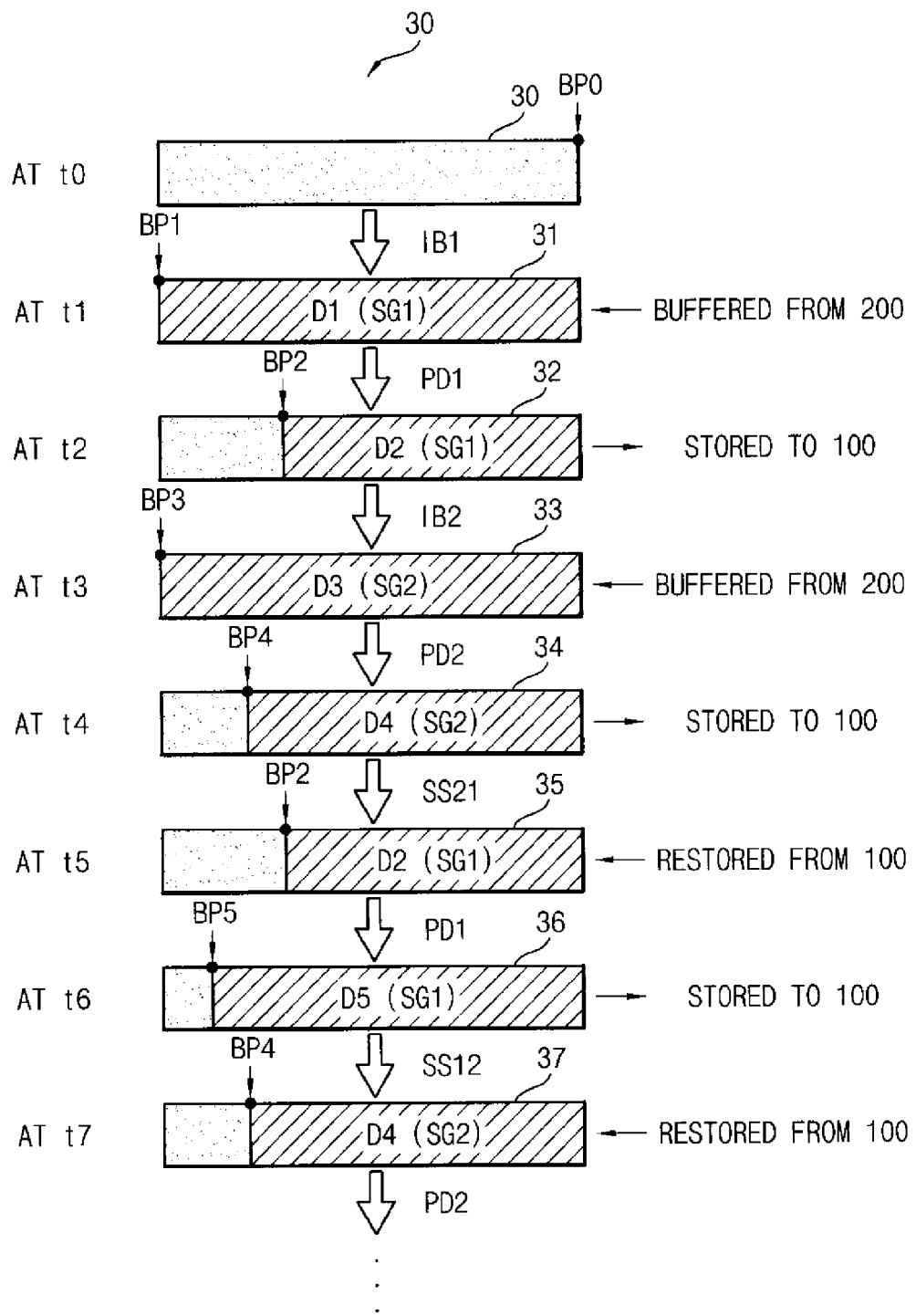
FIG. 10 is a diagram illustrating an operation of the stream shift buffer for the pipe-lined decoding of FIG. 9.

FIG. 9 is a diagram illustrating a pipe-lined decoding with respect to the slice groups of FIG. 6, and FIG. 10 is a diagram illustrating an operation of the stream shift buffer for the pipe-lined decoding of FIG. 9.

FIG. 9 illustrates the pipe-lined decoding that is performed in the raster-scan order from the macroblock 0 to the macroblock 191, regardless of the order of receiving the macroblocks through the input bit stream IBS. In FIGS. 9 and 10, PD1 indicates the pipe-lined decoding with respect to the first slice group SG1, PD2 indicates the pipe-lined decoding with respect to the second slice group SG2 and PD3 indicates the pipe-lined decoding with respect to the third slice group SG3. FIG. 10 illustrates the states 30 through 37 of the stream shift buffer 300 at each time point t0 through t7. As described with reference to FIG. 4, the hatched first region BSP1 represents the buffer space in which the valid data are stored and the dotted second region BSP2 represents the buffer space in which the invalid data are stored. The buffer pointer BP indicates the position of the valid data among the buffered data in the stream shift buffer 300.

Referring to FIGS. 9 and 10, an initial buffering operation IB1 with respect to the first slice group SG1 is performed during time interval t0~t1. In other words, the stream shift buffer 300 may be filled with the data bits of the memory bit stream MBS output from the first group memory region RG1 in the virtual division memory 200. At time point t0, the stream shift buffer 300 is in an empty state 30 and the buffer pointer has a maximum value BP0. At time point t1, the stream shift buffer 300 is in the state 31 and is filled with the data D1 of the first slice group SG1 by the initial buffering operation IB1 and the buffer pointer has a minimum value BP1.

The pipe-lined decoding PD1 is performed with respect to the first slice group SG1 during time interval t1~t2. In other words, the macroblocks 0 to 21 pertaining to the first slice group SG1 are decoded by the decoder circuit 400 in the raster-scan order. The data bits of the macroblocks 0 to 21 are output from the first group memory region RG1 in the virtual division memory 200 and provided sequentially to the decoder circuit 400 via the stream shift buffer 300.

An initial buffering operation IB2 is performed with respect to the second slice group SG2 during time interval t2~t3. In other words, the stream shift buffer 300 is filled with the data bits of the memory bit stream MBS output from the second group memory region RG2 in the virtual division memory 200. In this case, at time point t2 after the decoding of the macroblock 21 is completed, the state 32 of the stream shift buffer 300 is stored in the controller 100 as the current backup information CBI for the later stream shift operation. The state 32 to be stored in the controller 100 includes the buffered data in the stream shift buffer 300 and the buffer pointer BP2 indicating the valid data D2 among the buffered data. At time point t3, the stream shift buffer 300 is in the state 33 and is filled with the data D3 of the second slice group SG2 by the initial buffering operation IB2 and the buffer pointer has a minimum value BP3.

The pipe-lined decoding PD2 with respect to the second slice group SG2 is performed during time interval t3~t4. In other words, the macroblocks 22 to 29 pertaining to the second slice group SG2 are decoded by the decoder circuit 400 in the raster-scan order. The data bits of the macroblocks 22 to 29 are output from the second group memory region RG2 in the virtual division memory 200 and provided sequentially to the decoder circuit 400 via the stream shift buffer 300.

The stream shift operation SS21 from the second slice group SG2 to the first slice group SG1 is performed during time interval t4~t5. When the stream group, which is decoded by the decoder circuit 400 is changed from the second slice group SG2 to the first slice group SG1, the current state 34 of the stream shift buffer 300 at time point t4 is stored in the controller 100 as the current backup information CBI, and then the previous state 35 of the stream shift buffer 300 is restored at time point t5, based on the previous backup information PBI of the first slice group SG1, that is, the state 32 of the stream shift buffer 300 at time t2 which is previously stored in the controller 100.

The pipe-lined decoding PD1 is performed with respect to the first slice group SG1 again during time interval t5~t6. In other words, the macroblocks 30 to 37 pertaining to the first slice group SG1 are decoded by the decoder circuit 400 in the raster-scan order. The data bits of the macroblocks 30 to 37 are output from the first group memory region RG1 in the virtual division memory 200 and provided sequentially to the decoder circuit 400 via the stream shift buffer 300.

The stream shift operation SS12 from the first slice group SG1 to the second slice group SG2 is performed during time interval t6~t7. When the stream group, which is decoded by the decoder circuit 400 is changed from the first slice group SG1 to the second slice group SG2, the current state 36 of the stream shift buffer 300 at time point t6 is stored in the controller 100 as the current backup information CBI, and then the previous state 35 of the stream shift buffer 300 is restored at time point t7, based on the previous backup information PBI of the second slice group SG2, that is, the state 34 of the stream shift buffer 300 at time t4 which is previously stored in the controller 100.

The initial buffering operation IB3 with respect to the third slice group SG3 is performed during time interval t11~t12, and the pipe-lined decoding PD3 with respect to the macroblocks 98 to 103 of the third slice group SG3 is performed during time interval t12~t13.

During time interval t13~t14 when the stream group, which is decoded by the decoder circuit 400, is changed from the third slice group SG3 to the first slice group SG1, the stream shift operation SS31 from the third slice group SG3 to the first slice group SG1 is performed. In other words, the state of the stream shift buffer 300 at time point t13 is stored in the controller 100 as the current backup information CBI, and then the previous state of the stream shift buffer 300 is restored at time point t14, based on the previous backup information PBI of the first slice group SG1, that is, the state of the stream shift buffer 300 at time t11 which is previously stored in the controller 100.

During time interval t15~t16 when the stream group, which is decoded by the decoder circuit 400, is changed from the first slice group SG1 to the third slice group SG3, the stream shift operation SS13 from the first slice group SG1 to the third slice group SG3 is performed. In other words, the state of the stream shift buffer 300 at time point t15 is stored in the controller 100 as the current backup information CBI, and then the previous state of the stream shift buffer 300 is restored at time point t16, based on the previous backup information PBI of the third slice group SG3, that is, the state of the stream shift buffer 300 at time t13 which is previously stored in the controller 100.

Through such stream shift operations, the data bits from the macroblock 0 to the macroblock 191 may be provided sequentially to the decoder circuit 400 and the pipe-lined decoding may be performed in the raster-scan order with respect to the input bit stream IBS that is transferred according to the FMO scheme.

Figure 11:
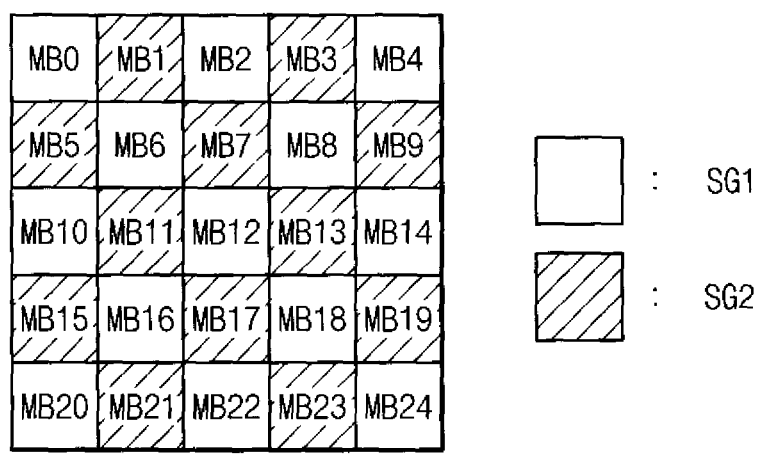
FIG. 11 is a diagram illustrating an example frame that is divided by two slice groups transferred in a scatter mode, according to an example embodiment.
Figure 12:
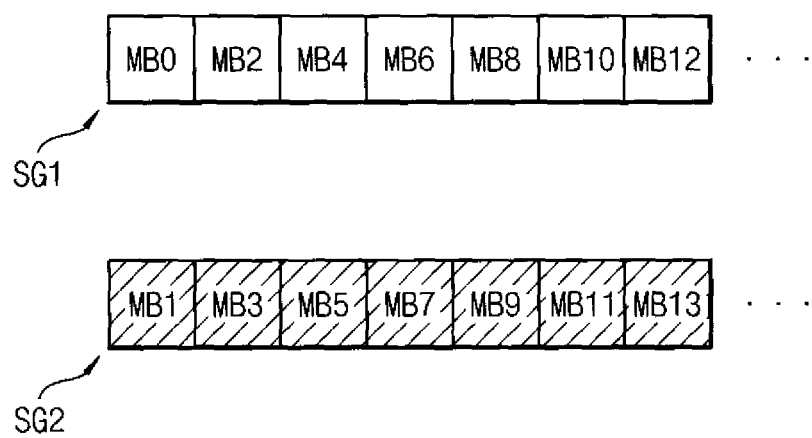
FIG. 12 is a diagram illustrating a transfer scheme of scatter mode, according to an example embodiment.

FIG. 11 is a diagram illustrating an example frame that is divided by two slice groups transferred in a scatter mode, and FIG. 12 is a diagram illustrating a transfer scheme of scatter mode.

FIG. 11 illustrates an example frame in which 25 macroblocks MB0 through MB24 are arranged in a matrix form. According to the scatter mode transfer, the even numbered macro blocks MB2-MB24 may be included in the first slice group SG1 and the odd-numbered macroblocks MB1-MB23 may be included in the second slice group SG2. As illustrated in FIG. 12, the even numbered macro blocks MB2-MB24 in the first slice group SG1 may be transferred independently of the odd-numbered macroblocks MB1-MB23 in the second slice group SG2. In the scatter mode transfer, even though the data of the one slice group is lost during transfer, the lost data may be recovered easily using the data of the other slice group.

Figure 13:
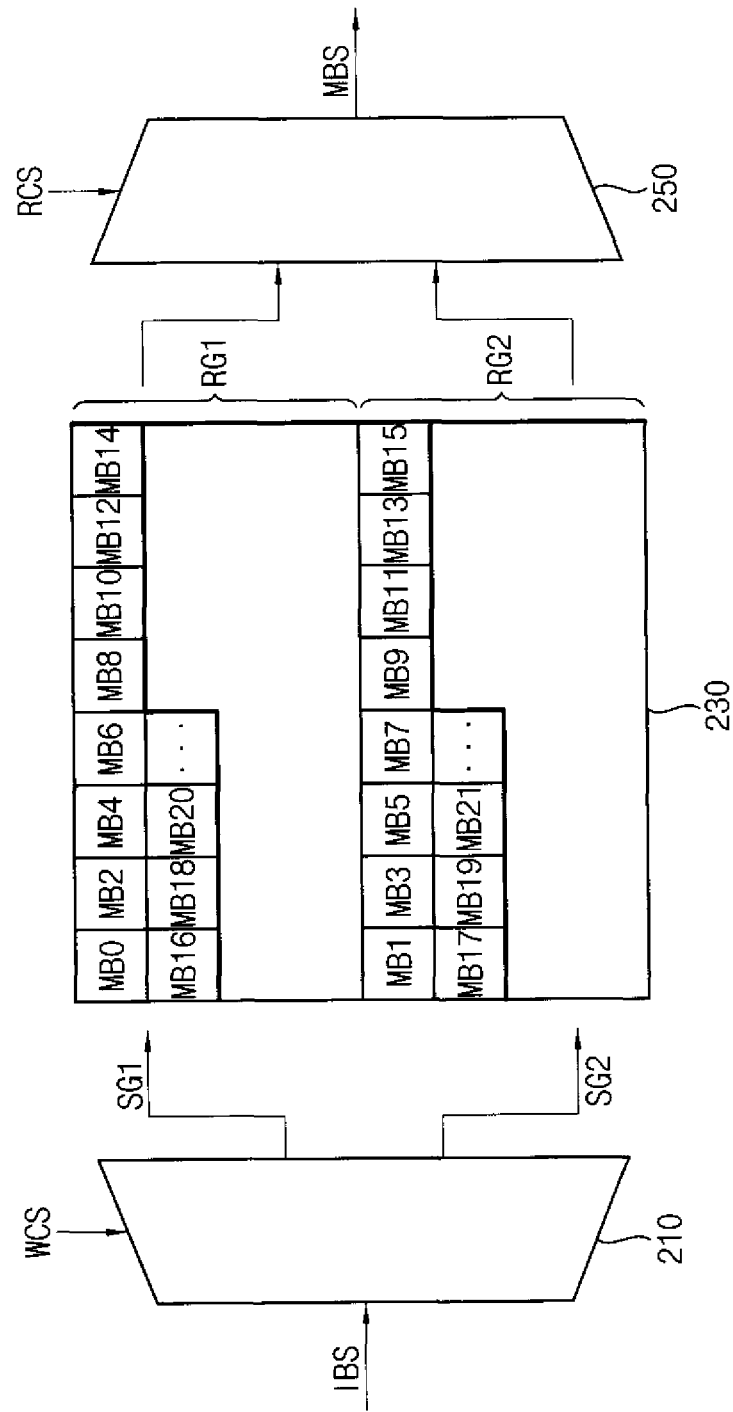
FIG. 13 is a diagram for describing an operation of the virtual division memory with respect to the slice groups of FIG. 11.

FIG. 13 is a diagram illustrating an operation of the virtual division memory with respect to the slice groups of FIG. 11.

Referring to FIG. 13, the memory region 230 in the virtual division memory 200 may be divided into the two group memory regions RG1 and RG2 corresponding to the two slice groups SG1 and SG2 corresponding to the scatter mode. As described above, the controller 100 may determine the two region start pointers to divide the memory region 230 logically into the two group memory regions RG1 and RG2.

The write control unit 210 in the virtual division memory 200 may perform a write operation based on a write control signal WCS, which is provided from the controller 100, to store the received stream groups, that is, the slice groups SGi (i=1, 2) in the corresponding group memory region RGi. As described above, the write control signal WCS may include the write enable signal WEN indicating a timing of the write operation and the write pointer WP indicating a position in which the received data bits are to be stored.

As described with reference to FIG. 3, among the write pointers WP1 and WP2 corresponding to the group memory regions RG1 and RG2, respectively, the controller 100 may generate the write control signal WCS based on the write pointer WPi corresponding to the group memory region RGi in which the received slice group SGi is stored. Whenever the write operation is performed, the controller 100 may update the write pointer WPi corresponding to the group memory region RGi in which the received slice group SGi is stored. Accordingly, the controller 100 may control the virtual division memory 200 to store the received data bits of the slice group SGi sequentially in the corresponding group memory region RGi.

The read control unit 250 in the virtual division memory 200 may perform a read operation based on a read control signal RCS, which is provided from the controller 100, to output the memory bit stream MBS from the group memory region RGk (k=1, 2) corresponding to the stream group SGk that is currently decoded by the decoder circuit 400. As described above, the read control signal RCS may include the read enable signal REN indicating a timing of the read operation and the read pointer RP indicating a position from which the data bits of the memory bit stream MBS are to be output.

As described with reference to FIG. 3, among the read pointers RP1 and RP2 corresponding to the group memory regions RG1 and RG2, respectively, the controller 100 may generate the read control signal RCS based on the read pointer RPk corresponding to the group memory region RGk from which the memory bit stream MBS is output. Whenever the read operation is performed, the controller 100 may update the read pointer RPk corresponding to the group memory region RGk from which the memory bit stream MBS is output. Accordingly, the controller 100 may control the virtual division memory 200 to read out the data bits of the memory bit stream MBS from the corresponding group memory region RGk.

Figure 14:
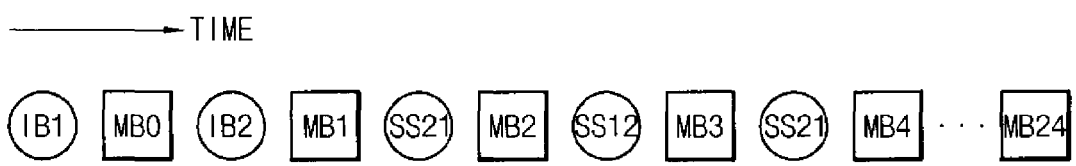
FIG. 14 is a diagram illustrating a pipe-lined decoding with respect to the slice groups of FIG. 11.

FIG. 14 is a diagram for describing a pipe-lined decoding with respect to the slice groups of FIG. 11.

FIG. 14 illustrates the pipe-lined decoding that is performed in the raster-scan order from the macroblock MB0 to the macroblock MB24. According to various embodiments, the pipe-lined decoding may be performed regardless of the order of receiving the macroblocks through the input bit stream IBS.

The initial buffering operation IB1 with respect to the first slice group SG1, the initial buffering operation IB2 with respect to the second slice group SG2, the stream shift operation SS21 from the second slice group SG1 and the stream shift operation SS12 from the first slice group SG1 to the second slice group SG2 are described above with reference to FIGS. 9 and 10.

When two-dimensional picture or frame consists of a plurality of macroblocks MB0 through MB24, a raster-scan is performed according to the index order from the macroblock MB0 to MB24. In other words, a macroblock having the arrangement as shown in FIG. 11, the macroblocks MB0, MB1, MB2, MB3 and MB4 in the first row are processed sequentially and then the macroblocks MB5, MB6, MB7, MB8 and MB9 in the second row are processed sequentially. Accordingly, all the macroblocks MB0 through MB24 are processed continuously according to the raster-scan scheme.

When the transferred data bits of the input bit stream includes macroblocks in a continuous order, the decoding operation may be performed in the raster-scan order. In this case, deblock filtering may be performed sequentially, macroblock by macroblock, and thus the pipe-lined processing of the image data may be implemented with low difficulty. However, when the input bit stream includes the macroblocks in a discontinuous order, such as according to flexible macroblock ordering (FMO) and arbitrary slice order (ASO) of the H.264/MPEG-4 standard, it may be difficult to perform the decoding operation in the raster-scan order. Where a macroblock has a discontinuous order, the deblock filtering has to be performed in the frame unit, not in the macroblock unit, and thus the pipe-lined processing of the image data may be difficult. As mentioned above, the encoded data bits may be transferred slice by slice and each slice may be transferred independently. The H.264/MPEG-4 standard adopts FMO and ASO to provide efficient error concealment such that the lost slice may be restored using the macroblocks in the other slices.

The bit stream processing device according to example embodiments performs the above-described division of the memory region and the stream shift operation so that the data bits of the macroblocks MB0 through MB24 may be sequentially provided to the decoder circuit 400, and thus the input bit stream IBS of the scatter mode may be pipe-lined decoded in the raster-scan order.

The slice groups in a frame may have various shapes, such as a rectangular shape, a chessboard shape, and the like. The information regarding the shapes of the slice groups may be provided as sequence parameter set (SPS) and picture parameter set (PPS) in network abstraction layer (NAL) unit.

Figure 15:
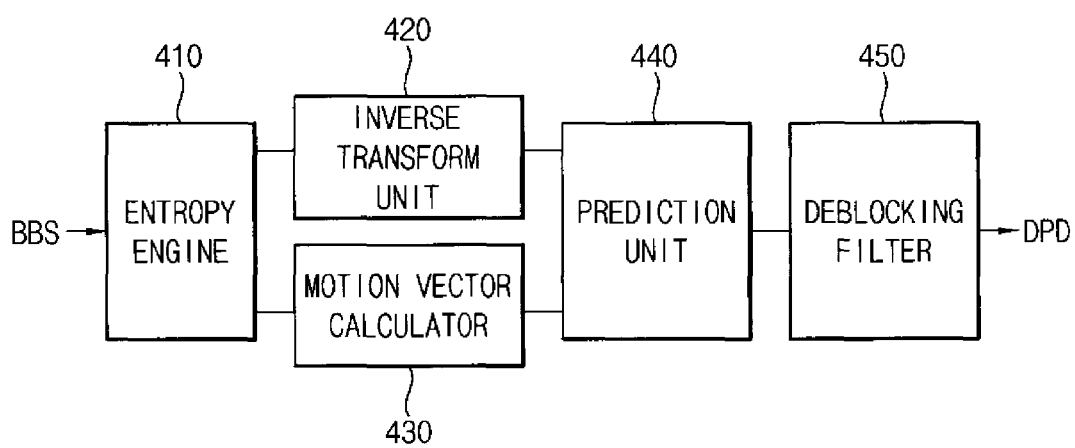
FIG. 15 is a diagram illustrating an example of a decoder circuit included in the bit stream processing device of FIG. 1.

FIG. 15 is a diagram illustrating an example embodiment of a decoder circuit 400 included in the bit stream processing device of FIG. 1.

Referring to FIG. 15, the decoder circuit 400 is configured to decode the buffer bit stream BBS, which may be provided from the stream shift buffer 300, in the raster-scan order and outputs display data DPD. The decoder circuit 400 may include an entropy engine 410, an inverse transform unit 420, a motion vector calculator 430, a prediction unit 440 and a deblocking filter 450. The elements of the decoder circuit 400 may be implemented with a processor and/or other like hardware module that is configured to perform the pipe-lined operation for enhance the decoding speed.

Video compression algorithms use information on the adjacent macroblocks to improve the performance of the device. Particularly the H.264/MPEG-4 standard specifies in-loop deblock filtering for using spatial correlations between pixel values. However, where the FMO bit stream is used, the conventional methods and devices are designed to perform the deblock filtering according to a frame unit due to the discontinuous transfer order of the macroblocks, and thus the decoding speed is decreased for a large amount of memory access.

Pipe-lined processing allows each unit process to be divided into discrete steps and at least one step of a next unit process may begin before the current unit process is completed. For example, the unit decoding process, with respect to each macroblock, may be processed by the elements as illustrated in FIG. 15, and each of the processing steps, with respect to several macroblocks, may be performed in parallel.

To support the pipe-lined decoding, the bit stream processing device according to example embodiments includes a virtual division memory configured to store the stream groups (e.g., the FMO slice groups) and output the stored stream groups independently. In addition, the bit stream processing device may further include the stream shift buffer configured to perform a stream shift operation such that, when the stream group currently decoded by the decoder circuit is changed from one stream group to another stream group, the state of the stream shift buffer may be stored and restored. Through the virtual division memory and the stream shift buffer, the data may be provided continuously to the decoder circuit 400 for the pipe-lined decoding in the raster-scan order. Accordingly, the bit stream processing device according to example embodiments may enhance the decoding speed by decoding the plurality of stream groups in the raster-scan order using the decoder circuit 400 as illustrated in FIG. 15.

Figure 16:
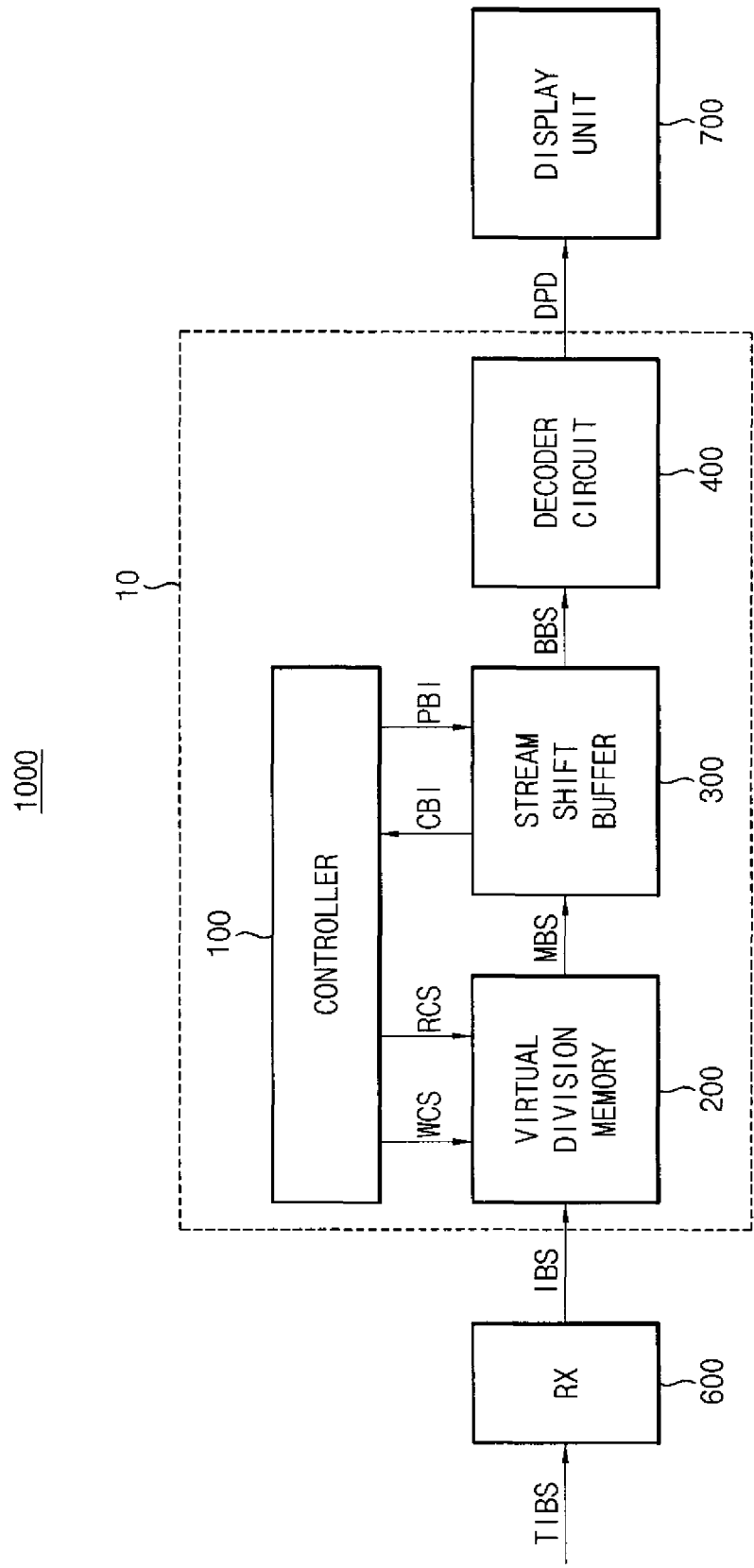
FIG. 16 is a block diagram illustrating a multimedia device, according to example embodiments.

FIG. 16 is a block diagram illustrating a multimedia device according to example embodiments.

Referring to FIG. 16, a multimedia device 1000 may include a reception interface (RX) 600, a bit stream processing device 10 and a display unit 700. The RX 600 is configured to receive an input bit stream TIBS including a plurality of stream groups. The bit stream processing device 10 is configured to perform pipe-lined decoding of the input bit stream IBS from the RX 600 and output display data DPD. The display unit 700 is configured to display images based on the display data DPD from the bit stream processing device 10. The RX 600 may be an interface for wireless or non-wireless communication. The display unit 700 may be a liquid crystal display (LCD), a light emitting diode (LED), an organic light emitting diode (OLED), a plasma display panel (PDP), or other like display device.

As described above, the bit stream processing device 10 may include a controller 100, a virtual division memory 200, a stream shift buffer 300, and a decoder circuit 400.

The virtual division memory 200 is configured to receive an input bit stream IBS and outputs a memory bit stream MBS. The virtual division memory 200 may be divided into a plurality of group memory regions RG1 through RGN configured to store a plurality of stream groups SG1 through SGN in the group memory regions RG1 through RGN, respectively, where the stream groups SG1 through SGN are included in the input bit stream IBS. The stream shift buffer 300 is configured to receive and store the memory bit stream MBS provided from the virtual division memory 200 and outputs a buffer bit stream BBS. The decoder circuit 400 is configured to perform a decoding operation on the buffer bit stream BBS from the stream shift buffer 300 and outputs the display data PDP. Accordingly, the controller 100 controls operations of the virtual division memory 200, the stream shift buffer 300 and the decoder circuit 400.

The virtual division memory 200 is configured to perform a write operation based on a write control signal WCS, which is provided from the controller 100, to store the received stream group SGi (i=1, 2, . . . , or N) in the corresponding group memory region RGi. In addition, the virtual division memory 200 is configured to perform a read operation based on a read control signal RCS, which is provided from the controller 100, to output the memory bit stream MBS from the group memory region RGk (k=1, 2, . . . , or N) corresponding to the stream group SGk that is currently decoded by the decoder circuit 400.

When the stream group currently being decoded by the decoder circuit 400 is changed from one stream group RGi to another stream group RGk, the controller 100 is configured to store a current state of the stream shift buffer 300 as backup information CBI of the one stream group RGi, and then restore a state of the stream shift buffer 300 to a previous state corresponding to the other stream group RGk based on the backup information PBI of the other stream group RGk that was previously stored in the controller 100. Accordingly, the pipe-lined decoding may be supported by the stream shift operation without degrading the decoding speed.

For example, the stream groups SG1 through SGN may be slice groups according to the H.264/MPEG-4 standard, and the slice groups may be transferred according to flexible macroblock ordering (FMO) scheme. According to such embodiments, the controller 100 may be configured to control the operations of the virtual division memory 200 and the stream shift buffer 300 such that the decoder circuit 400 decodes, in raster-scan order, a plurality of macroblocks included in the slice groups that correspond to one frame.

Figure 17:
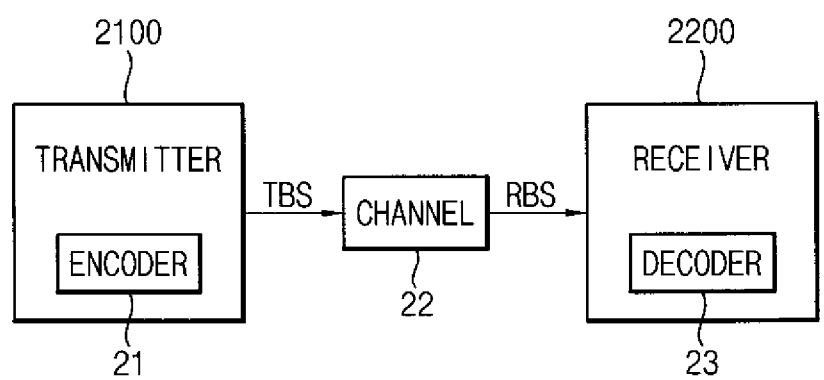
FIG. 17 is a block diagram illustrating a system, according to example embodiments.

FIG. 17 is a block diagram illustrating a system according to example embodiments.

Referring to FIG. 17, a system 2000 may include a transmitter 2100 including an encoder 21, a receiver 2200 including a decoder 23, and a channel 22 coupled between the transmitter 2100 and the receiver 2200.

The transmitter 2100 is configured to output a transmission bit stream TBS that includes data bits encoded by the encoder 21 according to a data compression standard, such as H.264/MPEG-4 and/or other like compression standards. The receiver 2200 is configured to receive a reception bit stream RBS through channel 22, and the decoder 23 is configured to perform a decoding operation on the reception bit stream RBS.

The channel 22 may be a wireless medium having a limited bandwidth. In such instances, the transmission bit stream TBS may be converted into a format suitable for wireless communication and the converted transmission bit stream TIBS may be restored by the receiver 2200. Data loss may occur between the transmission bit stream TBS and the reception bit stream RBS, regardless of whether channel 22 is a wired or wireless medium. However, a predetermined formation of the macroblocks and the FMO scheme of the H.264/MPEG-4 standard, for example, may provide resiliency and/or restorability of the lost data may be enhanced. The decoder 23 is configured to use the macroblocks in one slice group to restore the lost macroblocks in another slice group. The receiver 2200 may include the above-described virtual division memory 200 and/or stream shift buffer 30 to perform the pipe-lined decoding even though the reception bit stream RBS is transferred according to the FMO scheme.

The bit stream processing device and the multimedia device may be applied usefully to a system utilizing the encoding and/or decoding operation of a large amount of data. Particularly, example embodiments may be used to enhance the decoding speed where the stream groups are transferred in an arbitrary order, such as when the FMO scheme is used.

The foregoing is illustrative of example embodiments and is not to be construed as limiting thereof. Although example embodiments have been described, many modifications can be made in the example embodiments without departing from the present inventive concept. Accordingly, all such modifications are intended to be included within the scope of the present inventive concept.

What is claimed is:

1. A bit stream processing device comprising:
a virtual division memory divided into a plurality of group memory regions, the virtual division memory configured to store each one of a plurality of stream groups in a frame image in a corresponding one of the group memory regions, the stream groups in the frame image being included in an input bit stream and configured to output a memory bit stream;
a stream shift buffer configured to:
receive and store the memory bit stream and to output a buffer bit stream,
provide a buffer pointer indicating a position of valid data among buffered data stored in the stream shift buffer,
decrease the buffer pointer as a bit number of the memory bit stream is received from the virtual division memory, and
increase the buffer pointer as a bit number of the buffer stream is output to the decoder circuit;
a decoder circuit configured to perform a decoding operation on the buffer bit stream from the stream shift buffer; and
a controller configured to control operations of the virtual division memory, the stream shift buffer, and the decoder circuit,
wherein each of a plurality of write pointers and each of a plurality of read pointers correspond to each one of the group memory regions, and the controller is configured to:
generate a write control signal based on the write pointer corresponding to the group memory region in which the received stream group is stored,
update the write pointer corresponding to the group memory region in which the received stream group is stored when a write operation is performed,
generate a read control signal based on the read pointer corresponding to the group memory region from which the memory bit stream is output, and
update the read pointer corresponding to the group memory region from which the memory bit stream is output when a read operation is performed, and
wherein when a stream group in the frame image that is currently being decoded by the decoder circuit is changed from one stream group to another stream group in the frame image, the controller is configured to:
store a current state of the stream shift buffer as backup information of the one stream group, and
restore a state of the steam shift buffer to a previous state corresponding to the other stream group based on the backup information of the other stream group that was previously stored in the controller.

2. The bit stream processing device of claim 1, wherein the virtual division memory is configured to:
perform the write operation based on the write control signal, the write operation causing the virtual division memory to store the received stream group in the corresponding group memory region, and
perform the read operation based on the read control signal, the read operation causing the virtual division memory to output the memory bit stream from the group memory region corresponding to the stream group that is currently being decoded by the decoder circuit, the write control signal and the read control signal being provided by the controller.

3. The bit stream processing device of claim 1, wherein the controller is configured to control a timing of generating the read control signal based on the buffer pointer.

4. The bit stream processing device of claim 1, wherein the controller is configured to divide the virtual division memory into the group memory regions based on a plurality of region start pointers.

5. The bit stream processing device of claim 4, wherein the controller is configured to determine the region start pointers based on the number of stream groups.

6. The bit stream processing device of claim 1, wherein
the stream groups are slice groups according to the H.264 standard such that each slice groups includes at least one slice and each slice includes at least one macroblock, and
the slice groups are transferred according to a flexible macroblock ordering (FMO) scheme.

7. The bit stream processing device of claim 6, wherein the controller is configured to control operations of the virtual division memory and the stream shift buffer such that the decoder circuit decodes, in raster-scan order, a plurality of macroblocks included in the slice groups corresponding to one frame.

8. The bit stream processing device of claim 7, wherein when the slice groups that is currently being decoded by the decoder circuit is changed from one slice group to another slice group, the controller is configured to:
store a current state of the stream shift buffer as backup information of the one slice group, and
restore a state of the stream shift buffer to a previous state corresponding to the other slice group based on the backup information of the other slice group that was previously stored in the controller.

9. The bit stream processing device of claim 8, wherein the controller is configured to:
form a slice group map based on a sequence parameter set and a picture parameter set included in the input bit stream, and
when data bits of each macroblock are provided to the decoder circuit, according to the slice group map, determine whether the slice group currently being decoded by the decoder circuit has changed.

10. A bit stream processing device comprising:
a virtual division memory divided into a plurality of group memory regions, the virtual division memory configured to store each one of a plurality of stream groups in a frame image in a corresponding one of the group memory regions, the stream groups in the frame image being included in an input bit stream and configured to output a memory bit stream;
a stream shift buffer configured to:
receive and store the memory bit stream and to output a buffer bit stream,
provide a buffer pointer indicating a position of valid data among buffered data stored in the stream shift buffer,
decrease the buffer pointer as a bit number of the memory bit stream is received from the virtual division memory, and
increase the buffer pointer as a bit number of the buffer stream is output to the decoder circuit;
a decoder circuit configured to perform a decoding operation on the buffer bit stream from the stream shift buffer; and
a controller configured to control operations of the virtual division memory, the stream shift buffer, and the decoder circuit,
wherein each of a plurality of read pointers correspond to each one of the group memory regions, and the controller is configured to:
generate a read control signal based on the read pointer corresponding to the group memory region from which the memory bit stream is output, and
update the read pointer corresponding to the group memory region from which the memory bit stream is output when a read operation is performed, and
wherein when a stream group in the frame image that is currently being decoded by the decoder circuit is changed from one stream group to another stream group in the frame image, the controller is configured to:
store a current state of the stream shift buffer as backup information of the one stream group, and
restore a state of the stream shift buffer to a previous state corresponding to the other stream group based on the backup information of the other stream group that was previously stored in the controller.

11. A multimedia device comprising:
a reception interface configured to receive an input bit stream including a plurality of stream groups in a frame image;
a virtual division memory divided into a plurality of group memory regions, the virtual division memory configured to store each of the plurality of stream groups in the frame image in a corresponding one of the group memory regions and to output a memory bit stream, wherein each of a plurality of read pointers correspond to each one of the group memory regions;
a stream shift buffer configured to:
receive and store the memory bit stream and to output a buffer bit stream,
provide a buffer pointer indicating a position of valid data among buffered data stored in the stream shift buffer,
decrease the buffer pointier as a bit number of the memory bit stream is received from the virtual division memory, and
increase the buffer pointer as a bit number of the buffer stream is output to the decoder circuit;
a decoder circuit configured to perform a decoding operation on the buffer bit stream from the stream shift buffer and to output display data;
a controller configured to control operations of the virtual division memory, the stream shift buffer, and the decoder circuit, and when a currently decoded stream group in the frame image is changed from one stream group to another stream group in the frame image, the controller is configured to (i) generate a read control signal based on the read pointer corresponding the group memory region from which the memory bit stream is output, (ii) update the read pointer corresponding to the group memory region from which the memory bit stream is output when a read operation is performed, (iii) store a current state of the stream shift buffer as backup information and (iv) restore a state of the stream shift buffer to a previous state, the previous state corresponding to the other stream group based on a backup information of the other stream group; and
a display unit configured to display images based on the display data.

12. The multimedia device of claim 11, wherein
the stream groups are slice groups according to the H.264 standard and each slice groups includes at least one slice and each slice includes at least one macroblock, the slice groups are transferred according to flexible macroblock ordering (FMO) scheme, and
the controller is configured to control operations of the virtual division memory and the stream shift buffer such that the decoder circuit decodes, in raster-scan order, a plurality of macroblocks included in the slice groups corresponding to a frame.

13. The multimedia device of claim 11, wherein the controller is configured to provide a write control signal to the virtual division memory and the virtual division memory is configured to perform a write operation to store the plurality of stream groups in their corresponding group memory regions based on the write control signal.

* * * * *